United States Patent Office 3,825,486
Patented July 23, 1974

3,825,486
METHOD OF CONVERTING HYDROCARBONS
WITH MANGANESE NODULE CATALYSTS
Joseph N. Miale, Trenton, N.J., assignor to
Mobil Oil Corporation
No Drawing. Application Apr. 24, 1970, Ser. No. 31,776, now Patent No. 3,676,369, which is a continuation-in-part of application Ser. No. 597,243, Nov. 28, 1966, now Patent No. 3,509,041. Divided and this application Apr. 17, 1972, Ser. No. 244,988
The portion of the term of the patent subsequent to Apr. 28, 1987, has been disclaimed
Int. Cl. B01j 9/20; C10g 13/02, 5/72
U.S. Cl. 208—110                                             9 Claims

ABSTRACT OF THE DISCLOSURE

This specification discloses the conversion of hydrocarbons employing a catalyst comprising a base-exchanged, calcined manganese silicate-containing mineral in the form of a manganese nodule, said mineral having hydrogen ions bonded thereto in an amount of at least 0.01 gram per 100 grams of said mineral.

This application is a division of application Ser. No. 31,776, filed Apr. 24, 1970; now U.S. Pat. No. 3,676,369, issued July 11, 1972, which latter application was a continuation-in-part of application Ser. No. 597,243, filed Nov. 28, 1966, now U.S. Pat. No. 3,509,041, issued Apr. 28, 1970.

BACKGROUND OF THE INVENTION

Field of the invention

This invention relates to manganese silicate catalysts in the form of manganese nodules, to methods for the preparation of the same from naturally occurring manganese nodules and to organic compound conversion with catalytically active forms of the manganese nodules. More particularly, this invention is directed to manganese silicate nodules containing at least 0.01 gram hydrogen ions per 100 grams manganese nodules.

DISCUSSION OF THE PRIOR ART

In U.S. 3,214,236 of Oct. 26, 1965, entitled Method of Catalytically Oxidizing Hydrocarbon and Carbon Monoxide to Carbon Dioxide, the use of manganese nodules as catalysts is disclosed. The manganese nodules utilized therein contain manganese and several other important metals including iron, cobalt, nickel and copper. The manganese nodules are recovered from the floor of certain bodies of water, normally oceans. They are characterized by a large surface area, generally in excess of 200 square meters per gram. It has become desirable, more recently, to utilize these manganese nodules in a variety of organic conversion reactions. More particularly, it has become desirable to provide manganese silicate nodules which contain hydrogen ions which have replaced alkali metal or alkaline earth metal cations in the nodules in the as received state. Accordingly, it is an object of the present invention to provide manganese silicate nodules which contain at least 0.01 gram hydrogen per 100 grams of the manganese nodules.

SUMMARY OF THE INVENTION

Broadly, this invention contemplates a catalyst comprising a base-exchanged, calcined manganese silicate-containing mineral in the form of a manganese nodule, said mineral having hydrogen ions bonded thereto in an amount of at least 0.01 gram per 100 grams of said mineral. In a particularly desirable embodiment, this invention contemplates a catalyst comprising a base-exchanged, calcined manganese silicate-containing mineral in the form of a manganese nodule, said mineral having hydrogen ions bonded thereto in an amount between 0.01 and 0.5 gram per 100 grams of said manganese nodule.

DISCUSSION OF SPECIFIC EMBODIMENTS

As indicated above, it has been found that manganese nodules provide an exceptionally good source of manganese silicate. These manganese nodules can be treated, as described below, to replace a certain portion of the alkali or alkaline earth metal cations with hydrogen ions.

The manganese nodules utilized as catalyst in the present method contain not only manganese, but several other important metals including iron, cobalt, nickel and copper. The manganese nodules, as above indicated, are found on the floor of oceans and are particularly abundant in the Pacific Ocean. The nodules are characterized by a large surface area, i.e. in excess of 200 m.$^2$/gram. The manganese nodules have a wide variety of shapes but most often they look like potatoes. Their color varies from earthy black to brown depending upon their relative manganese and iron content. The nodules are porous and light, having an average specific gravity of about 2.4. Generally they range from 1 to 9 inches in diameter but may extend up to considerably larger sizes approximating 4 ft. in length and 3 ft. in diameter and weighing as much as 1700 lbs. The nodules utilized as catalysts in the method described herein may be of any suitable particle size useful in the particular conversion operation. Thus, the particle size of the manganese nodules may vary from fairly large pieces down to and including powdered material useful in a fluidized catalytic operation. Manganese nodules, it should be understood, can occur in several different salt forms. They can occur as silicates and they can occur as manganese dioxide. The manganese nodules contemplated for treatment pursuant to the present invention are manganese silicate nodules. These can be recovered from naturally occurring deposits, especially from deposits on the floors of the Atlantic Ocean and Pacific Ocean. The various manganese silicate nodules assay over a considerably wide range and include various metals including nickel, copper, cobalt, zinc and molybdenum. Some of the minerals in the nodules have no names, because their exact crystalline structure have never been encountered before. Generally speaking, manganese nodules in the form of a manganese silicate are characterized by having the broad assay range as follows: 11.4–90 percent $MnO_2$, 2.8–42.3 percent $SiO_2$, 0.8–44.1 percent $Fe_2O_3$, 3.7–29.7 percent water and 0.3–12.8 percent alumina. It will be seen that the manganese dioxide content of the manganese silicate nodule can vary over a considerably wide range. This is due to the fact that these nodules are not synthesized but are recovered and mined generally from ocean floors.

As indicated, and as shown in the examples, natural manganese nodules exhibit a catalytic action in the conversion of hydrocarbons. When, however, it is converted to the hydrogen form, in which at least a portion of its alkali metal and/or alkaline earth metal cations are replaced by hydrogen ions, its catalytic action is considerably increased. To effect such conversion, the nodules are treated with a fluid medium containing hydrogen ion precursors to give a composite which, after calcination, contains hydrogen ions. "Composite" is the term applied to the mineral after a portion, at least, of its alkali and/or alkaline earth metal cations has been replaced by hydrogen ion precursors. The step involved is base exchange, followed by calcination, and the hydrogen ions are bonded to the manganese nodules, thereby forming the composite. The latter is strongly acidic as a result. To illustrate the treatment, the nodules can be arranged in the form of a fixed bed, and the fluid medium in the form of an aqueous solution is passed slowly through the bed at room temperature and atmospheric pressure for a time sufficient to substantially replace the alkali metal cations of the original nodules. The aqueous solution is characterized by having a pH above that at which the nodules decompose, preferably above 4, more preferably above 4.5. When the treatment is finished, the resulting composite is washed, preferably with distilled water, until the effluent wash water has a pH between 5 and 8.

Considering the foregoing treatment in more detail, the fluid medium may be aqueous or non-aqueous, preferably aqueous. Polar solvents are useful and these may be aqueous or non-aqueous. The latter include organic solvents which permit ionization of hydrogen-containing substances added thereto, and which include cyclic and acyclic ethers such as dioxane, tetrahydrofuran, diethyl ether, diisopropyl ether, and the like; ketones such as acetone and methyl ethyl ketone; esters such as ethyl acetate, propyl acetate; alcohols such as ethanol, propanol butanol, etc.; and miscellaneous solvents such as dimethylformamide, and the like. Other fluid media are carboxy polyesters.

A preferred base-exchange procedure comprises treating the nodules with an aqueous solution of a compound which supplies hydrogen ion precursor, such as ammonium ion, washing the material as described, drying it at 100–300° F., and then heating it to a temperature below its decomposition temperature to convert the substituent ammonium ions to hyodrgen ions. The ammonium ions may be supplied by such compounds as ammonium chloride, ammonium bromide, ammonium iodide, and ammonium carbonate; other representative ammonium compounds suitable herein are described in U.S. Pat. Nos. 3,140,252 and 3,140,253. The concentration of ammonium compound in the base-exchange solution is usually up to 5% by weight but may be higher. It may also be noted that mono-, di-, and trialkylammonium salts, as well as mono-, di-, and triarylammonium salts, are capable of supplying substituted ammonium cations which, on calcination, are converted to hydrogen ions; thus these salts are of value for the base exchange.

Base exchange may be carried out at ambient temperatures and below to temperatures just below that at which the nodules decompose. Pressures may vary from subatmospheric to superatmospheric, and the duration of treatment is that sufficient to permit substantial replacement of alkali metal and/or alkaline earth metal cations. At the conclusion of the step, the material is dried, as by heating to 100–300 degrees F. for a period of up to 10 or 20 hours. The dried material is then calcined in air at 800 to 1400° F., preferably 1000° F., for up to 20 or more hours. Calcining converts the ammonium or substituted ammonium ion to hydrogen ion. The resulting composite may have bonded thereto at least 0.01 gram, preferably 0.01 to 0.5 gram of hydrogen ions per 100 gram of composite.

If desired, the nodules, either before, during, or after base exchange, may be mixed in any desired way with a matrix, generally comprising an inorganic oxide of porous character, which can serve as a binder and, if suitably chosen, may serve as an auxiliary catalyst, A number of appropriate matrixes are set forth in U.S. 3,210,267 and include silica-alumina gel, silica gel, alumina gel, as well as gels of alumina-boria, silica-zirconia, silica-magnesia, and the like. Natural clays are useful, such as kaolin, attapulgite, kaolinite, bentonite, montmorillonite, etc., and if desired, the clays may be calcined or chemically treated as with an acid or an alkali.

Turning now to a consideration of hydrogen conversions, these include cracking, hydrocracking, oxidation, olefin hydrogenation, and olefin isomerization.

Cracking of suitable hydrocarbon stocks is generally carried out at a temperature of 800–1100° F., a pressure ranging from subatmospheric to several hundred atmospheres, and a liquid hourly space velocity (LHSV), i.e., the liquid volume of hydrocarbon per hour per volume of catalyst, of 1 to 10 to produce valuable products in the gasoline boiling range. The charge stock may be any material heretofore used in conventional cracking employing conventional silica-alumina catalyst.

The process may be carried out in any equipment suitable for catalytic operations, and may be operated batchwise or continuously, and with a fixed bed of catalyst or a moving bed wherein the hydrocarbon flow may be concurrent or countercurrent to the catalyst flow. A fluid type of operation may also be employed. The resulting product may suitably be separated by conventional means. Also, the catalyst after use over an expanded period of time may be regenerated in accordance with conventional procedures by burning off carbonaceous deposit from the surface of the catalyst in an oxygen-containing atmosphere under conditions of elevated temperature.

Hydrocracking is generally carried out at 400 to 950° F. For such process, the nodules may suitably be combined with one or more dehydrogenation components, exemplary of which are the metals, oxides and sulfides of metals of Group VI and VIII of the Periodic Table. The hydrogen pressure in such operation is usually within the range of 100 to 3000, preferably 350 to 2000 p.s.i.g. The liquid hourly space velocity is between 0.1 and 10. In general, the molar ratio of hydrogen to hydrocarbon is between 2 and 80, preferably between 5 and 50. Suitable charge stocks comprise petroleum fractions having an initial boiling point of at least about 400° F., a 50% point of at least about 500° F., and an end point of at least about 600° F. Such hydrocarbon fractions include gas oils residual oils, cycle stocks, whole topped crudes, and heavy fractions from the destructive hydrogenation of coal, tars, pitches, asphalts, and the like.

Hydrocarbon oxidation may be carried out at temperatures of 250 to 1500° F. in the presence of oxygen or air. Mole ratio of charge to oxygen is 1:0.1 to 1:200. The LHSV is 1 to 1000. This reaction is of value in a number of applications, as in automobile exhaust gas catalytic converters where unburned products in the gas are oxidized to $CO_2$ and water.

In olefin hydrogenations the temperature ranges up to 1000° F., the pressure from 10 to 3000 p.s.i., and the sure of 100–3000 pounds per square inch gage, a liquid saturated hydrocarbons, to remove gum formers from gasoline, to pretreat stocks for cracking, hydrocracking, and the like.

Olefin isomerization, comprising the shift of a double bond in an olefin, is suitably performed at 300 to 900° F., a pressure of 1 to 10 atmospheres, and an LHSV of 0.1 to 10. The process is of value in the manufacture of olefin addition products such as alcohols and alkyl halides.

The invention may be illustrated by the following examples:

EXAMPLE 1

A sample of manganese nodules from the Pacific Ocean was tested for hexane cracking, giving an alpha of 4.9. Then an aliquot of the same was base exchanged with ammonium chloride employing a 250 ml. aqueous solution of 1 normal ammonium chloride solution at room temperature. The exchange was performed for 20 hours. A 1 ml. aliquot was calcined at 1000° F., and tested for hexane cracking. It gave an alpha of 19.6. The alpha value was determined in accordance with the method set forth by P. B. Weisz and J. N. Miale in "Journal of Catalysts" Vol. 4, No. 4, August, 1965, pp. 527–9.

EXAMPLE 2

A sample of manganese nodules from the Pacific Ocean was crushed to 14–30 mesh (U.S. Screen). A 3 ml. aliquot was charged to a microcatalytic reactor and tested for hexane cracking activity at 1000° F. The material was regenerated after 30 minutes on stream and retested for hexane cracking.

EXAMPLE 3

An aliquot of ground manganese nodules from Example 1 was base-exchanged over a 48-hour period using six contacts with hot 1-normal ammonium chloride solution and hot water washes between exchanges. A 3 ml. aliquot of the exchanged nodule was tested for hexane cracking activity as in Example 2.

HEXANE CRACKING ACTIVITY ($\alpha$)

| Example: | Initial | After regeneration |
|---|---|---|
| 2 | 0.6 | 0.7 |
| 3 | 1.2 | 1.9 |

These examples show improvement in cracking activity brought about by base exchange.

EXAMPLE 4

A sample of manganese nodules from the (Blake Plateau) Atlantic Ocean was crushed to about 1 micron particle size, washed with boiling water, and dried at 110° C. The material was pelleted and sized to 14–30 mesh (U.S. Screen). An aliquot was tested for hexane cracking as in Example 2. Results are tabulated below.

EXAMPLE 5

An aliquot of the granular material prepared in Example 4 was base-exchanged as in Example 3 but with a hot solution of 0.25 molar ammonium EDTA. (Ethylene diamminetetraacetic acid titrated to a pH of 7.0 by addition of ammonium hydroxide.) The dried product was tested for hexane cracking activity as in Example 2. Results are shown below.

HEXANE CRACKING ACTIVITY

| | Initial | | After regeneration | |
|---|---|---|---|---|
| | $\alpha$ | Selectivity* | $\alpha$ | Selectivity* |
| Example: | | | | |
| 4 | 0.9 | 23.8 | 1.0 | 21.2 |
| 5 | 1.2 | 34.1 | 1.3 | 49.1 |

*Selectivity=C$_4$+product/total cracked products.

These examples show improvement in cracking activity and product quality.

The invention contemplates mixing one or more base-exchanged manganese nodules, or any of those described, with a crystalline aluminosilicate such as, by way of example, Zeolite A, Zeolite X, Zeolite Y or other crystalline aluminosilicates described in U.S. Pat. Nos. 3,140,252 and 3,140,253.

I claim:

1. The method of converting a hydrocarbon which comprises contacting said hydrocarbon under conversion conditions with a catalyst comprising a base-exchanged manganese silicate-containing mineral in the form of manganese nodules having hydrogen ions bonded thereto in an amount of at least 0.01 gram per 100 grams of said mineral.

2. The method of Claim 1 wherein said converting step comprises hydrogenating an olefin in the presence of hydrogen and under hydrogenating conditions.

3. The method of Claim 1 wherein said converting step comprises isomerizing an olefin under isomerization conditions.

4. The method of Claim 1 wherein said converting step comprises oxidizing a hydrocarbon in the presence of oxygen and under oxidizing conditions.

5. A method of cracking a hydrocarbon comprising contacting said hydrocarbon under cracking conditions with a catalyst comprising a base-exchanged manganese silicate-containing mineral in the form of manganese nodules having hydrogen ions bonded thereto in an amount of at least 0.01 gram per 100 grams of said mineral.

6. The method of claim 5 wherein said hydrogen ions bonded to said mineral are in an amount of 0.01 to 0.5 gram per 100 grams of said mineral.

7. The method of claim 5 wherein said hydrocarbon is contacted with said catalyst in the presence of hydrogen.

8. The method of claim 5 wherein said hydrocarbon is contacted with said catalyst at a temperature of 800–1100° F., a pressure from subatmospheric to several hundred atmospheres, and a liquid hourly space velocity of 1 to 10.

9. The method of claim 7 wherein said hydrocarbon is contacted with said catalyst in the presence of said hydrogen at a temperature of 400–950° F., a hydrogen pressure of 100–3000 pounds per square inch gage, a liquid hourly space velocity between 0.1 and 10, and a molar ratio of hydrogen to hydrocarbon between 2 and 80.

References Cited

UNITED STATES PATENTS

| 2,966,506 | 12/1960 | Jordan | 260—448 C |
| 3,130,006 | 4/1964 | Rabo et al. | 423—328 |
| 3,214,236 | 10/1965 | Weisz | 423—213 |
| 3,336,240 | 8/1967 | Erickson et al. | 252—455 Z |
| 3,375,064 | 3/1968 | Miale et al. | 423—328 |
| 3,509,041 | 4/1970 | Miale | 208—110 |
| 3,676,369 | 7/1972 | Miale | 252—454 |

DELBERT E. GANTZ, Primary Examiner

G. E. SCHMITKONS, Assistant Examiner

U.S. Cl. X.R.

208—111, 119, 120, 143; 260—683.2, 683.9; 423—213.2

UNITED STATES PATENT OFFICE
CERTIFICATE OF CORRECTION

Patent No. 3,825,486                                Dated July 23, 1974

Inventor(s) Joseph N. Miale

It is certified that error appears in the above-identified patent and that said Letters Patent are hereby corrected as shown below:

Column 3, line 29, "hydorgen" should read --hydrogen--;
            line 69, "hydrogen" should read --hydrocarbon--.

Column 4, line 12, "product" should read --products--;
            line 38, "LHSV" should read --VHSV--;
            line 44, "sure of 100-3000 pounds per square inch gage, a liquid" should read --LHSV from 0.1 to 10. The operation is useful to form--.

Signed and sealed this 5th day of November 1974.

(SEAL)
Attest:

McCOY M. GIBSON JR.
Attesting Officer

C. MARSHALL DANN
Commissioner of Patents